US012300205B2

(12) United States Patent
Katoh

(10) Patent No.: US 12,300,205 B2
(45) Date of Patent: May 13, 2025

(54) ROTARY OPERATION DEVICE, AND ELECTRONIC KEYBOARD INSTRUMENT

(71) Applicant: CASIO COMPUTER CO., LTD., Tokyo (JP)

(72) Inventor: Hirokatsu Katoh, Kawasaki (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 260 days.

(21) Appl. No.: 18/177,327

(22) Filed: Mar. 2, 2023

(65) Prior Publication Data

US 2023/0306941 A1 Sep. 28, 2023

(30) Foreign Application Priority Data

Mar. 24, 2022 (JP) ................................. 2022-048927

(51) Int. Cl.
*G10H 1/34* (2006.01)
*G05G 1/10* (2006.01)

(52) U.S. Cl.
CPC ................. *G10H 1/34* (2013.01); *G05G 1/10* (2013.01); *G10H 2220/265* (2013.01)

(58) Field of Classification Search
CPC ....... G10H 1/34; G10H 2220/265; G05G 1/10
See application file for complete search history.

(56) References Cited

U.S. PATENT DOCUMENTS 7,038,148 B2 * 5/2006 Shirakawa ............ G05G 5/005 200/43.11
2011/0035902 A1 2/2011 Ikeda
2013/0161175 A1 * 6/2013 Koiwai .............. H03K 17/9622 200/5 R
2021/0295810 A1 9/2021 Sasaki et al.
2023/0306941 A1 * 9/2023 Katoh ...................... G05G 1/10

FOREIGN PATENT DOCUMENTS

| | | | | | |
|---|---|---|---|---|---|
| CN | 113703516 | A | * | 11/2021 | |
| JP | 108329776 | A | | 12/1996 | |
| JP | 2000195375 | A | | 7/2000 | |
| JP | 2004176418 | A | | 6/2004 | |
| JP | 2007048482 | A | * | 2/2007 | ............ G05G 9/047 |
| JP | 2007059064 | A | | 3/2007 | |
| JP | 2009134949 | A | * | 6/2009 | |
| JP | 2011040280 | A | | 2/2011 | |
| JP | 2011243493 | A | * | 12/2011 | .............. G05G 1/08 |
| JP | 2012033357 | A | | 2/2012 | |
| JP | 2021148930 | A | | 9/2021 | |

OTHER PUBLICATIONS

Notice of Reasons for Refusal dated Jan. 16, 2024 received in Japanese Patent Application No. JP 2022-048927.

* cited by examiner

*Primary Examiner* — Robert W Horn
(74) *Attorney, Agent, or Firm* — Scully, Scott, Murphy & Presser, P.C.

(57) ABSTRACT

A rotary operation device according to an embodiment of the present disclosure includes: a rotation detection unit configured to detect rotation; a knob; and an accommodation unit configured to accommodate the rotation detection unit, wherein the knob includes an operation portion configured to rotate in interlock with the rotation detection unit, and a stopper portion disposed more on a radially inner side than an outer edge portion of the operation portion, and the accommodation unit includes an engaging portion configured to be engaged with the stopper portion.

17 Claims, 5 Drawing Sheets

ROTARY OPERATION DEVICE, AND ELECTRONIC KEYBOARD INSTRUMENT

CROSS-REFERENCE TO RELATED APPLICATIONS

This application is based upon and claims the benefit of priority from Japanese Patent Application No. 2022-048927, filed Mar. 24, 2022, the entire contents of which are incorporated herein by reference.

FIELD

The present disclosure relates generally to a rotary operation device, and an electronic keyboard instrument.

BACKGROUND

In a rotary operation device provided on various apparatuses such as an acoustic apparatus, such a structure is known that a detection unit including a rotational shaft, and a part of a knob engaged with the rotational shaft, are accommodated in a case, and an operation portion of the knob, which a user rotates and operates, is disposed outside the case.

SUMMARY

A rotary operation device according to an embodiment of the present disclosure comprises: a rotation detection unit configured to detect rotation; a knob; and an accommodation unit configured to accommodate the rotation detection unit, wherein the knob includes an operation portion configured to rotate in interlock with the rotation detection unit, and a stopper portion disposed more on a radially inner side than an outer edge portion of the operation portion, and the accommodation unit includes an engaging portion configured to be engaged with the stopper portion.

DETAILED DESCRIPTION

Figure 1:
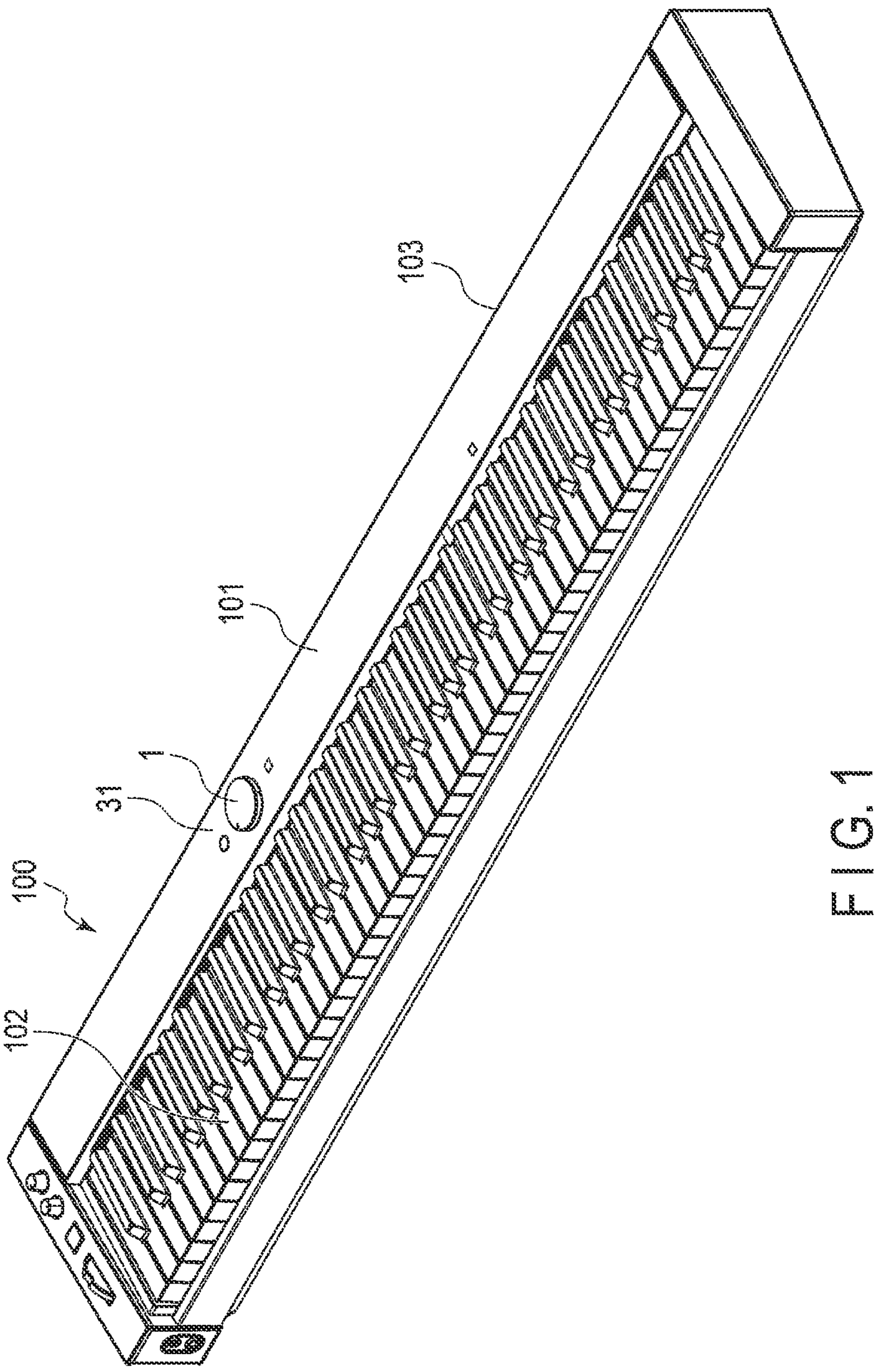
FIG. 1 is a perspective view illustrating an external appearance structure of an electronic keyboard instrument according to a first embodiment.
Figure 2:
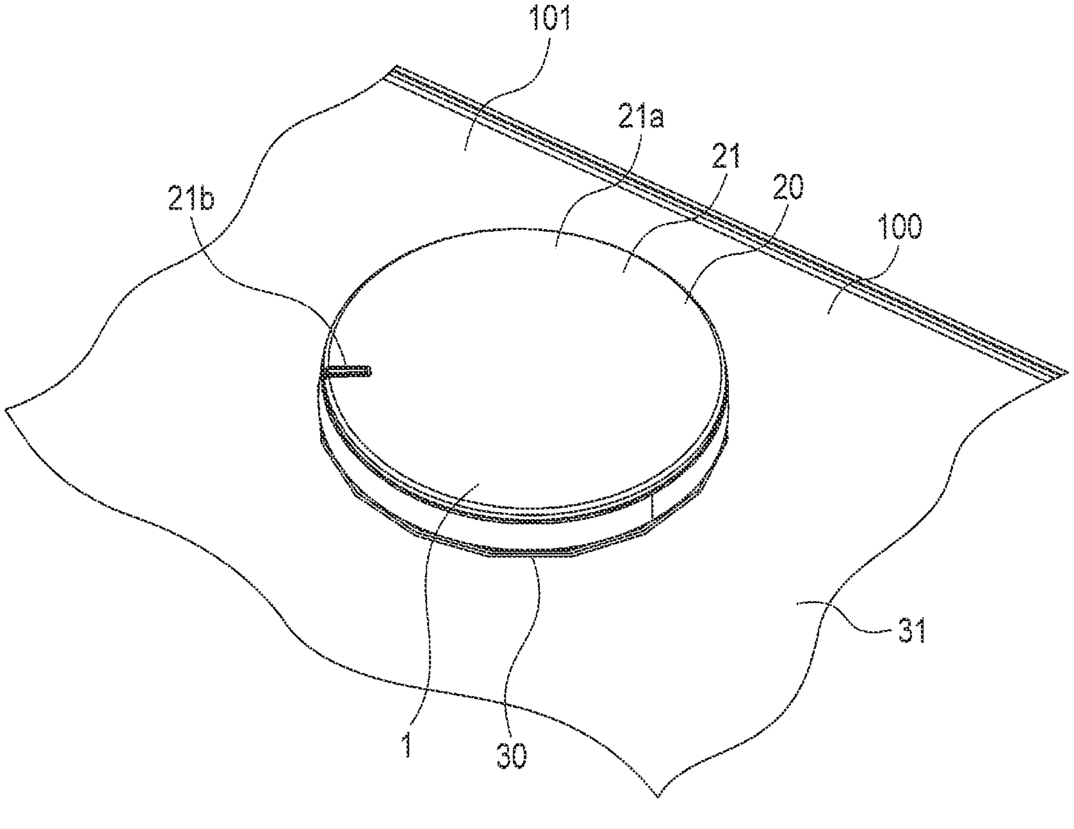
FIG. 2 is a perspective view illustrating an external appearance structure of a rotary operation device according the embodiment.
Figure 3:
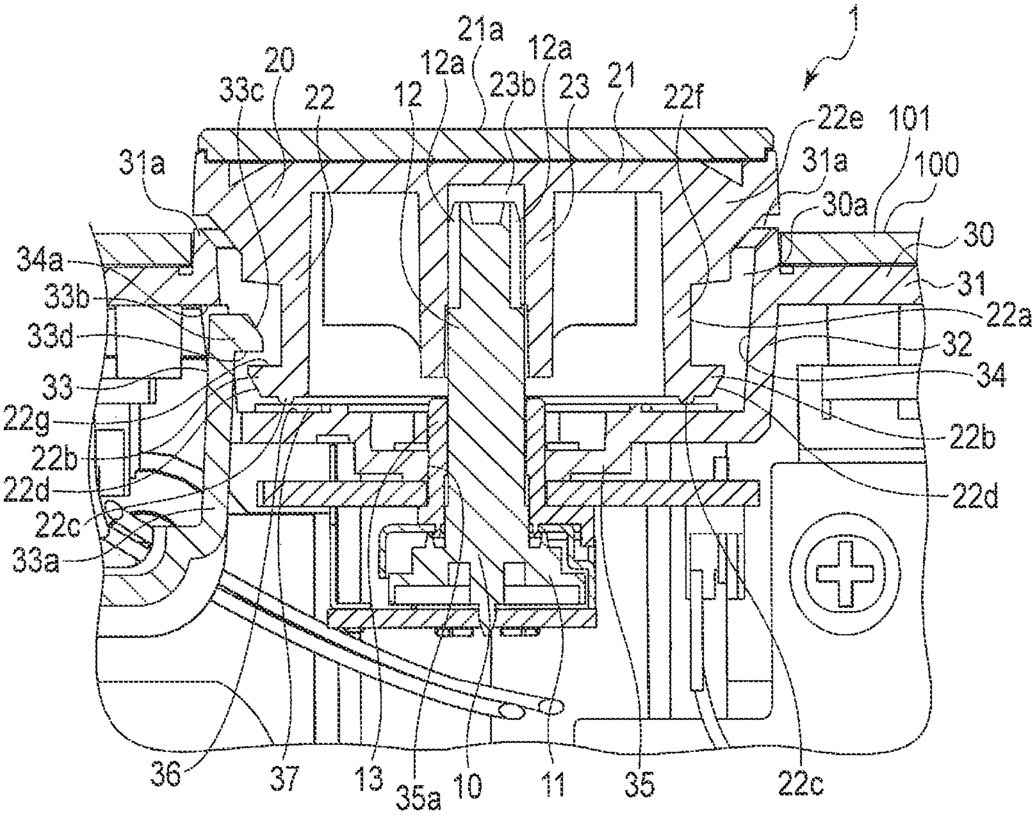
FIG. 3 is a cross-sectional view illustrating a structure of the rotary operation device.
Figure 4:
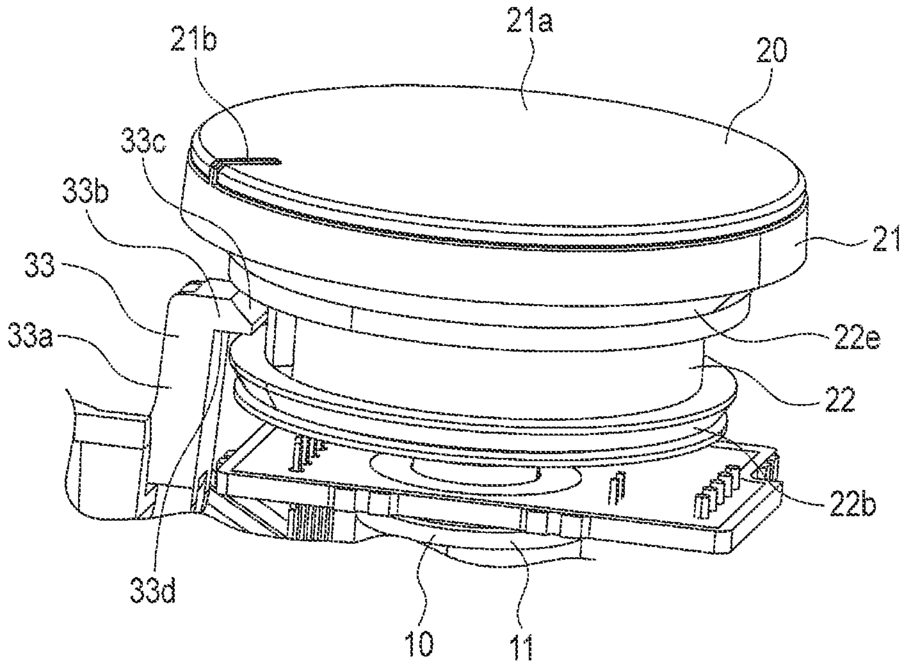
FIG. 4 is a perspective view illustrating a structure of a part of the rotary operation device.
Figure 5:
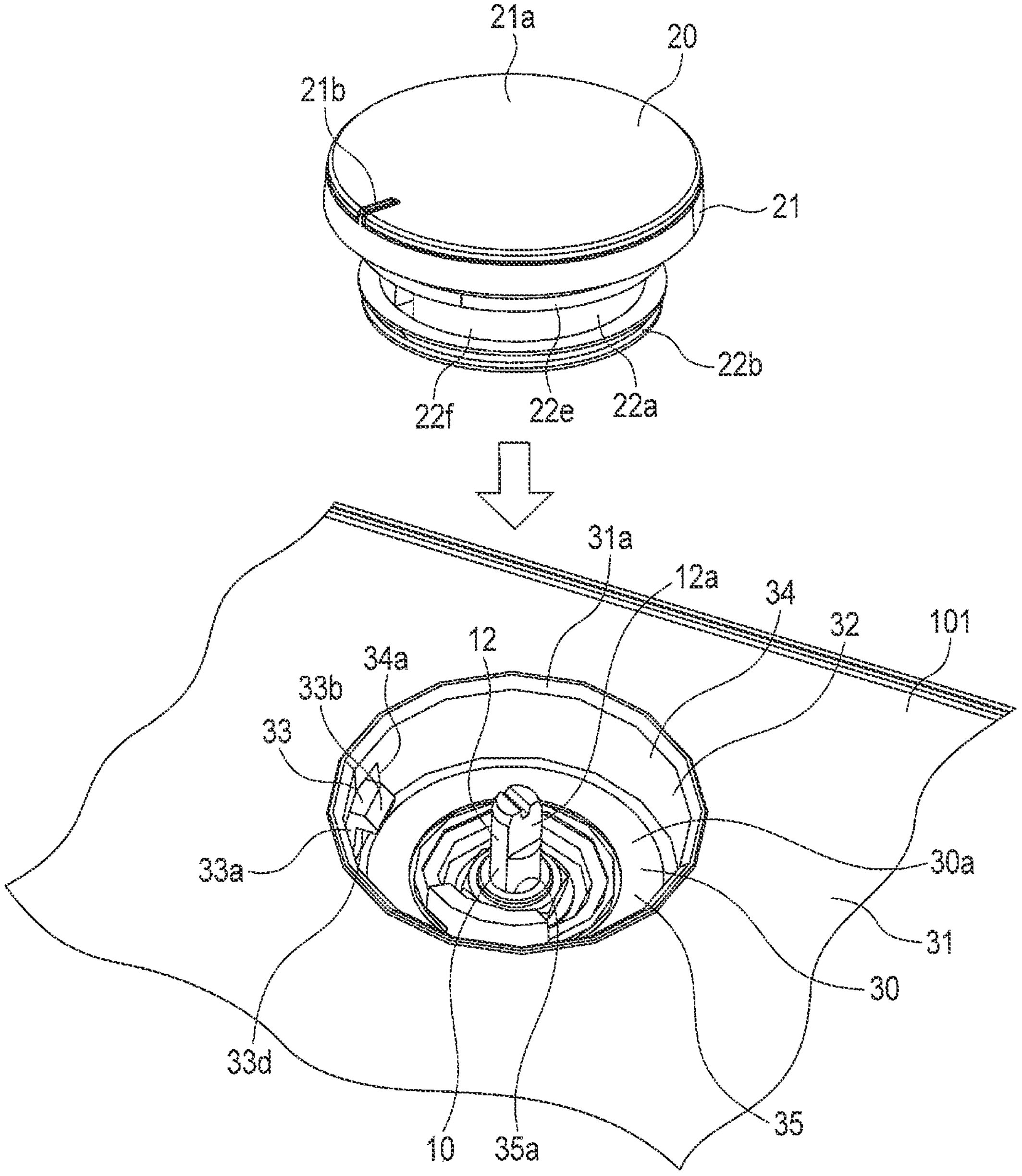
FIG. 5 is an explanatory view illustrating an attachment method of the rotary operation device.

Hereinafter, a rotary operation device 1 according to a first embodiment of the present disclosure is described with reference to FIG. 1 to FIG. 5. FIG. 1 is a perspective view of an electronic keyboard instrument 100 including the rotary operation device 1. FIG. 2 is a perspective view illustrating an external appearance structure of the rotary operation device 1. FIG. 3 is a cross-sectional view of the rotary operation device. FIG. 4 is a perspective view illustrating a structure of a part of the rotary operation device, and illustrates an internal structure, with a part of an accommodation unit 30 being omitted. FIG. 5 is an explanatory view illustrating an attachment method of the rotary operation device. In the Figures, structures are schematically illustrated by being enlarged, reduced or omitted as appropriate.

As illustrated in FIG. 1 to FIG. 4, the rotary operation device 1 includes a rotation detection unit 10 including a rotational shaft 12; a knob 20 engaged with the rotational shaft 12 of the rotation detection unit 10; and the accommodation unit 30 that holds the rotation detection unit 10 and the knob 20. The rotary operation device 1 is a switch device that a user rotates and operates, and is, for example, a volume switch provided on equipment such as an acoustic apparatus.

The rotary operation device 1 is provided, for example, on the electronic keyboard instrument 100 that is an instance of the equipment illustrated in FIG. 1. The electronic keyboard instrument 100 includes a case 101, the rotary operation device 1, a keyboard 102, and a sound output unit 103. The case 101 accommodates the rotary operation device 1, the keyboard 102, and the sound output unit 103 on a rear side opposite to the keyboard 102. In the present embodiment, the rotary operation device 1 is disposed such that one end and the other end of the rotational shaft 12 are directed toward an inner side (back side) and an outer side (top side) of the electronic keyboard instrument 100, respectively.

As illustrated in FIG. 2 to FIG. 4, the rotation detection unit 10 includes a detection module 11, and the rotational shaft 12 (shaft portion) projecting from the detection module 11. The rotation detection unit 10 detects rotation.

The detection module 11 includes various switch components such as a switch element, and a board. The detection module 11 detects rotational movements of the knob 20, such as a rotational amount and a rotational angle, via the rotational shaft 12, and executes angular control. The detection module 11 is held in the accommodation unit 30 via a sleeve 13.

A proximal end portion of the rotational shaft 12 is connected to the detection module 11, and a distal end portion of the rotational shaft 12 is engaged with the knob 20. The rotational shaft 12 is disposed in such a manner as to project from the detection module 11.

The distal end portion of the rotational shaft 12 is formed in a shape including a cut portion **12*a* that is formed by cutting out a part of an outer peripheral surface of the distal end portion in the axial direction. The cut portion 12*a* includes a planar part crossing the circumferential direction, and restricts a relative rotational movement between the knob 20 and the rotational shaft 12, which are disposed to be opposed to each other. In other words, by the cut portion 12*a*, the rotational shaft 12 rotates in accordance with the rotational movement of the knob 20**.

A proximal part of the rotational shaft 12 is held on a bottom wall portion 35 (to be described later) of the accommodation unit 30 via the sleeve 13.

The knob 20 is provided on a top-side end portion of the rotational shaft 12. A part of the knob 20 is disposed in the accommodation unit 30, and another part of the knob 20 is exposed to the outside of the accommodation unit 30. The knob 20 includes, as one piece, a discoid operation portion 21, an outer cylinder portion 22 provided on a back side of the operation portion 21, and a cylindrical inner cylinder portion 23 provided on a radially inner side (inside diameter side) of the outer cylinder portion 22.

The operation portion 21 is formed in a discoid shape, and is provided on the distal side of the rotational shaft 12. The operation portion 21 is formed to have an outside diameter greater than an opening edge **31*a*** of the accommodation unit

30, and covers the top side of the opening edge 31*a*. The operation portion 21 rotates in interlock with the rotation detection unit 10. For example, the operation portion 21 functions as a so-called knob portion operated by the user, with at least one circular major surface and a one-side portion of an outer peripheral surface thereof being exposed to the outer surface of the electronic keyboard instrument 100 on the outside of the accommodation unit 30. The operation portion 21 has a two-layer structure including a cover member 21*a* that is a decorative sheet or the like. Note that the operation portion 21 may not include the cover member 21*a*. The operation portion 21 includes an outer edge portion that is greater than the opening edge 31*a* formed on the accommodation unit 30. Specifically, the outside diameter of the operation portion 21 is set to be greater than the diameter of an inner edge portion of the tapered opening edge 31*a*, and is preferably set to be greater than the diameter of an outer edge portion of the tapered opening edge 31*a*. For example, the cover member 21*a* may include an opening in which the opening edge 31*a* is disposed, and the outside diameter of the operation portion 21 may be set to be greater than a boundary portion between the cover member 21*a* and the outer periphery of the opening edge 31*a* of a panel portion 31, thus covering the top side of the boundary portion. An index portion 21*b* that is indicative of the rotational position of the operation portion 21 is provided on an outside major surface of the operation portion 21.

The outer cylinder portion 22 is formed as one piece with the operation portion 21. The outer cylinder portion 22 is inserted and held in the accommodation unit 30.

The outer cylinder portion 22 includes, as one piece, a reduced-diameter portion 22*e* extending from a part of a back surface of the operation portion 21 toward the back side; an engaging wall portion 22*f* extending from the reduced-diameter portion 22*e* further toward the back side; and a stopper portion 22*b* with an annular shape, which is formed at an end portion of the engaging wall portion 22*f*.

The reduced-diameter portion 22*e* is formed in a cylindrical shape, and an outer surface thereof is formed in a taper shape more on a radially inner side than an outer edge of the operation portion 21. The tapered outer surface of the reduced-diameter portion 22*e* is disposed to be opposed to the tapered opening edge 31*a*.

The engaging wall portion 22*f* is formed in a cylindrical shape extending from the reduced-diameter portion 22*e* toward the back side. The engaging wall portion 22*f* is inserted in the inside of a case body 32 of the accommodation unit 30. A circumferential groove portion 22*a* that is recessed to the radially inner side is formed in a part of an outer peripheral surface of the outer cylinder portion 22, and thereby the engaging wall portion 22*f* is formed to have a small thickness. An end portion of a hook portion 33*b* (to be described later) is disposed in the circumferential groove portion 22*a*.

The stopper portion 22*b* is formed in a flange shape projecting to the radially outer side from an end edge portion of the cylindrical engaging wall portion 22*f*. The outside diameter of the stopper portion 22*b* is smaller than the diameter of the outer edge portion of the operation portion 21, and is positioned more on the radially inner side than the outer edge portion of the operation portion 21. An edge portion on the outer peripheral side of the stopper portion 22*b* and on the inner side of the electronic keyboard instrument 100 constitutes a guide portion 22*d* that is formed in such a taper shape as to have a decreasing diameter on the inner side of the electronic keyboard instrument 100. A surface of the stopper portion 22*b* on the outer side of the electronic keyboard instrument 100 forms a surface perpendicular to the axial direction, and constitutes a removal prevention portion 22*g* that restricts a movement in the axial direction.

An end face on the distal side of the stopper portion 22*b* constitutes an annular planar surface, and includes a projection portion 22*c* that projects in the axial direction. The projection portion 22*c* is formed to have, for example, a semicircular cross section, in order to reduce a contact area with a receiving surface 36 that is disposed to be opposed.

The inner cylinder portion 23 is integrally formed on the back side of the operation portion 21, and extends to the back side in the first direction. The inner cylinder portion 23 is formed in a cylindrical shape that is coaxial with the outer cylinder portion 22 and has a smaller diameter than the outer cylinder portion 22. The inner cylinder portion 23 includes an engagement hole 23*b* (engagement portion), which is recessed to the outer side of the electronic keyboard instrument 100, and in which the distal end portion of the rotational shaft 12 is press-inserted and engaged.

The inner cylinder portion 23 includes a stepped portion at a predetermined location of an intermediate portion of the engagement hole 23*b*, the stepped portion being opposed to a stepped surface of the end portion of the cut portion 12*a* of the rotational shaft 12, thereby positioning the rotational shaft 12 at a predetermined position.

Note that a reinforcement rib or the like may be formed in the space between the inner cylinder portion 23 and the outer cylinder portion 22.

The accommodation unit 30 includes the panel portion 31 having a generally planar shape, and a hold member 33 functioning as an engaging portion, which is constituted as a separate body from the panel portion 31.

The panel portion 31 is, for example, a part of the case 101 of the electronic keyboard instrument 100 that is an object to which attachment is made. For example, the panel portion 31 includes, as a part thereof, the case body 32 including a peripheral wall portion 34 and the bottom wall portion 35. Note that the panel portion 31 is a double structure including a cover member such as a decorative sheet, which may be formed of a single panel member.

The peripheral wall portion 34 is formed in a cylindrical shape extending to the back side from the panel portion 31. The peripheral wall portion 34 includes, at least in a part in the circumferential direction, an opening 34*a* in which the hold member 33 is disposed.

The bottom wall portion 35 is formed in a discoid shape, and is connected to a back-side end portion of the peripheral wall portion 34. The bottom wall portion 35 is disposed to be opposed to a back-side end portion of the outer cylinder portion 22. The bottom wall portion 35 includes, in a central portion thereof, a hole portion 35*a* in which the rotational shaft 12 is inserted. The bottom wall portion 35 holds the rotation detection unit 10. The bottom wall portion 35 includes the annular receiving surface 36 that is opposed to the projection portion 22*c* on the distal surface of the outer cylinder portion 22, and a slide member 37 provided on the receiving surface 36. The slide member 37 is a member such as a tape of Teflon (trademark), which reduces a friction, and is attached to the receiving surface 36.

The case body 32 includes an accommodation recess portion 30*a* having a bottomed circular shape, which is surrounded by the peripheral wall portion 34 and the bottom wall portion 35. The opening edge 31*a* of the accommodation recess portion 30*a* is formed to have a diameter that is equal to or less than the outside diameter of the knob 20. An inner peripheral surface of the opening edge 31*a* is formed in such an inclined taper shape as to have a reduced diameter on the back side.

The hold member 33 is disposed to be opposed to at least a part of the outer peripheral portion of the stopper portion 22*b* of the outer cylinder portion 22, and is configured to be engageable with the stopper portion 22*b*. The hold member 33 is disposed in the opening 34*a* formed in the peripheral wall portion 34, and includes, as one piece, an arm 33*a* extending to the outer side of the electronic keyboard instrument 100, and a hook portion 33*b* that is formed at a distal end of the arm 33*a* and projects to the radially inner side.

The arm 33*a* has spring-like resiliency, and is formed to be resiliently deformable, for example, such that the hook portion 33*b* moves in the radial direction. An edge portion of the hook portion 33*b* on the distal side and on the radially inner side is inclined in the axial direction and formed in a taper shape, thus constituting a second guide portion 33*c* that guides insertion of the outer cylinder portion 22. The proximal side of the hook portion 33*b* is formed in a planar shape perpendicular to the axial direction, and constitutes a removal prevention portion 33*d*.

The hold member 33 restricts a movement of the outer cylinder portion 22 in a direction in which the outer cylinder portion 22 is removed, by the inwardly projecting hook portion 33*b* being disposed on the top side of the stopper portion 22*b* in the axial direction (i.e., on the outer side of the electronic keyboard instrument 100). For example, the hold member 33 is formed as a separate body from a member that is separate from the case body 32. For example, the hold member 33 is constituted as a part of a separate member that is provided in the vicinity of the case body 32, and, for example, the hold member 33 can be formed by utilizing a member or the like, which fixes a peripheral member such as a power button or a board.

As illustrated in FIG. 5, at a time of assembling the rotary operation device 1 with the above structure, the knob 20 is attached to the distal end portion of the rotational shaft 12 from the top surface side of the apparatus into the accommodation recess portion 30*a* in which the rotation detection unit 10 is disposed. At this time, such positioning is performed that the outer cylinder portion 22 is inserted in the accommodation recess portion 30*a* and the rotational shaft 12 is inserted in the hole of the inner cylinder portion 23, and then the outer cylinder portion 22 is pushed in the direction of insertion. In addition, the tapered guide portion 22*d* abuts on, and interferes with, the second guide portion 33*c*, and, by the force in the direction of insertion, there occurs a force by which the stopper portion 22*b* pushes the hook portion 33*b* to the outer side. Thus, the stopper portion 22*b* deforms the arm 33*a* in such a manner as to displace the hook portion 33*b* to the outer side, and the stopper portion 22*b* goes over the hook portion 33*b* and moves forward in the direction of insertion (i.e., toward the inner side of the electronic keyboard instrument 100). If the stopper portion 22*b* reaches the attachment position that is forward in the direction of insertion beyond the hook portion 33*b*, the hold member 33 restores to the original position and the hook portion 33*b* is disposed in the removal prevention position that is behind the stopper portion 22*b* in the direction of insertion.

In the rotary operation device 1 and electronic keyboard instrument 100 having the above structures, the stopper portion 22*b* and the hook portion 33*b* can constitute a removal prevention mechanism by which the stopper portion 22*b* and the hook portion 33*b* are engaged at the engagement position within the outside diameter of the operation portion 21. Accordingly, so-called "after-assembly" is enabled, in which the knob 20 is inserted after the accommodation unit 30 and the rotation detection unit 10 are assembled. Thus, for example, compared to pre-assembly, a risk of causing a flaw on the knob 20 can be suppressed, and the workability can be improved. Moreover, the external appearance and the stability in removal prevention can be secured.

In addition, by the engagement between the stopper portion 22*b* and the hold member 33, a high removal prevention effect can be obtained. Therefore, the attachability can more easily be secured than, for example, enhancing the engaging force of the shaft.

Additionally, according to the rotary operation device 1 of the present embodiment, the accommodation recess portion 30*a* can be covered by the knob 20 by making the diameter of the opening edge 31*a* of the accommodation recess portion 30*a* equal to or less than the outside diameter of the knob 20. Therefore, even if the precision in position of the knob 20 to the accommodation recess portion 30*a* is slightly displaced, the external appearance is not injured.

Additionally, the distal surface of the outer cylinder portion 22 is formed in an annular shape, and the receiving surface 36 is provided which is opposed to the position that is forward in the direction of insertion of the hook portion 33*b*, and thereby the inclination of the knob 20 at a time of operation can be suppressed. Accordingly, the looseness of the knob 20 can be decreased, and the removal prevention capability can be enhanced. Furthermore, by forming the projection portion 22*c* with a curved outer surface on the end face of the outer cylinder portion 22, the contact area is decreased and the frictional resistance is decreased, and thereby the rotational movement can be made smoother.

Additionally, in the rotary operation device 1 according to the above embodiment, the bottom wall portion 35 that supports the rotational shaft 12 and the peripheral wall portion 34 that supports the outer periphery of the outer cylinder portion 22 are integrally formed of an identical member, and thereby the precision in position of the support portions at the two locations can easily be secured, and the holding capability can be enhanced. For example, the precision in position can easily be secured, compared to a structure in which clamping is performed by disposing hold members, which are different members, on a front side and a back side of a flange portion.

Additionally, the hold member 33 having spring-like resiliency for removal prevention is formed as a separate member from the case body 32, and thereby both the deformability of the hook portion 33 and the precision in position of the case body 32 can compatibly be attained, and the structure for easy insertion and difficult removal can be achieved.

Note that the above-described embodiment is illustrated merely as an example, and does not restrict the scope of the invention.

For example, the rotary operation device 1 may be configured to be insertable/removable, such that the knob 20 can be removed by following a predetermined procedure. For example, in the rotary operation device 1, if the knob 20 is rotated to a rotational position of a full volume, or is further rotated in a volume-increasing direction, a gap is created which allows the knob 20 to incline relative to the rotational shaft 12. Specifically, by setting the rotational position of the knob 20 to a predetermined position, the cut portion 12*a* is disposed in a position opposed to the hook portion 33*b* or in a predetermined position on the opposite side to the hook portion 33*b*, and a gap of a predetermined amount is secured between the cut portion 12*a* and the opposed surface of the knob 20. By setting the dimension of this gap to a dimension that allows the knob 20 to incline relative to the rotational shaft 12, the stopper portion **22*b*** may be configured to be removed in the direction of removal.

Additionally, for example, in the above embodiment, the example is illustrated in which the cover member **21*a* is provided on the top surface of the operation portion 21, but the cover member 21*a* and the operation portion 21 may be formed as one piece. Besides, although the structure is illustrated in which the top surface of the panel portion 31** is covered with a decorative sheet, a structure without the decorative sheet may be adopted.

Additionally, the apparatus, on which the rotary operation device 1 is provided, is not limited to the acoustic apparatus, and the rotary operation device 1 is applicable to various kinds of apparatuses including switch devices that are rotated and operated.

Although some embodiments of the present invention have been described, the present invention is included within the scope of inventions recited in the patent claims and equivalents thereof.

What is claimed is:

1. A rotary operation device comprising:
a rotation detection unit configured to detect rotation;
a knob; and
an accommodation unit configured to accommodate the rotation detection unit, wherein
the knob includes an operation portion configured to rotate in interlock with the rotation detection unit, and a stopper portion disposed more on a radially inner side than an outer edge portion of the operation portion, and
the accommodation unit includes an engaging portion configured to be engaged with the stopper portion.

2. The rotary operation device of claim 1, wherein
the rotation detection unit includes a rotational shaft, and
the operation portion includes an engagement portion configured to be engaged with the rotational shaft.

3. The rotary operation device of claim 2, wherein the accommodation unit includes a case body including a bottom wall and a peripheral wall, the bottom wall including a hole portion in which the rotational shaft is inserted, and the peripheral wall being disposed on an outer periphery of the knob.

4. The rotary operation device of claim 3, wherein the engaging portion is formed as a separate body from the case body.

5. The rotary operation device of claim 1, wherein the engaging portion includes a hook portion configured to be resiliently deformable by interference with the stopper portion at a time of insertion of the knob into the accommodation unit.

6. The rotary operation device of claim 3, wherein the stopper portion includes, at a position opposed to the bottom wall of the case body, a projection portion that projects toward the bottom wall.

7. The rotary operation device of claim 1, wherein the knob is provided such that a part of the knob is disposed in the accommodation unit, and another part of the knob is exposed to an outside of the accommodation unit.

8. The rotary operation device of claim 1, wherein the knob includes, as one piece, an operation portion with a discoid shape, an outer cylinder portion provided on a back side of the operation portion, and an inner cylinder portion with a cylindrical shape provided on a radially inner side of the outer cylinder portion.

9. The rotary operation device of claim 8, wherein the operation portion includes a two-layer structure including a cover member.

10. The rotary operation device of claim 8, wherein the outer cylinder portion includes, as one piece, a reduced-diameter portion extending from a part of a back surface of the operation portion toward a back side, an engaging wall portion extending from the reduced-diameter portion further toward the back side, and the stopper portion that has an annular shape and is formed at an end portion of the engaging wall portion.

11. The rotary operation device of claim 10, wherein the reduced-diameter portion is formed in a cylindrical shape, and an outer surface thereof is formed in a taper shape more on the radially inner side than an outer edge of the operation portion.

12. The rotary operation device of claim 10, wherein
a circumferential groove portion that is recessed to the radially inner side is formed in a part of an outer peripheral surface of the outer cylinder portion, and thereby the engaging wall portion is formed to have a small thickness, and
an end portion of a hook portion included in the engaging portion is disposed in the circumferential groove portion.

13. The rotary operation device of claim 10, wherein
the stopper portion is formed in a flange shape projecting to a radially outer side of the outer cylinder portion from an end edge portion of the engaging wall portion that is cylindrical, and
the stopper portion includes a guide portion formed in a taper shape with a decreasing diameter, and a removal prevention portion that restricts a movement in an axial direction of the outer cylinder portion.

14. The rotary operation device of claim 8, wherein the inner cylinder portion is formed in a cylindrical shape that is coaxial with the outer cylinder portion and has a smaller diameter than the outer cylinder portion, and includes an engagement portion in which a distal end portion of the rotational shaft included in the rotation detection unit is press-inserted and engaged.

15. The rotary operation device of claim 3, wherein the peripheral wall includes, at least in a part in a circumferential direction, an opening in which the engaging portion is disposed.

16. The rotary operation device of claim 1, wherein the engaging portion includes, as one piece, an arm extending toward an outer side of the electronic keyboard instrument, and a hook portion formed at a distal end of the arm.

17. An electronic keyboard instrument comprising:
the rotary operation device of claim 1;
a keyboard;
a sound output unit; and
a case accommodating the rotary operation device, the keyboard, and the sound output unit.

* * * * *